Dec. 20, 1966          R. M. LANG          3,292,870
VEGETATION PROCESSING MACHINE
Filed Dec. 15, 1964                    7 Sheets-Sheet 1

INVENTOR.
RAYMOND M. LANG
BY
Caswell Lagaard & Wicks
ATTORNEYS

Dec. 20, 1966  R. M. LANG  3,292,870
VEGETATION PROCESSING MACHINE
Filed Dec. 15, 1964  7 Sheets-Sheet 4

INVENTOR.
RAYMOND M. LANG
BY
Caswell Lagaard & Wicks
ATTORNEYS

Dec. 20, 1966  R. M. LANG  3,292,870
VEGETATION PROCESSING MACHINE
Filed Dec. 15, 1964  7 Sheets-Sheet 5

INVENTOR.
RAYMOND M. LANG
BY
Caswell Lagaard & Wicks
ATTORNEYS

INVENTOR.
RAYMOND M. LANG
BY
Caswell Lagaard & Wicks
ATTORNEYS

Dec. 20, 1966  R. M. LANG  3,292,870
VEGETATION PROCESSING MACHINE
Filed Dec. 15, 1964  7 Sheets-Sheet 7

INVENTOR.
RAYMOND M. LANG
BY
Caswell Lagaard & Wicks
ATTORNEYS

United States Patent Office 3,292,870
Patented Dec. 20, 1966

3,292,870
VEGETATION PROCESSING MACHINE
Raymond M. Lang, Valley View Hills,
Minneapolis, Minn. 55318
Filed Dec. 15, 1964, Ser. No. 418,492
17 Claims. (Cl. 241—65)

The herein disclosed invention relates to vegetation processing machines and particularly to a machine which will process green or wet vegetation.

Another object of the invention resides in providing a machine in which the material passing through the machine may be both dried and threshed.

A still further object of the invention resides in providing a machine in which the vegetation is crushed to expedite the drying process.

Another object of the invention resides in providing a machine which will mix grains, feeds or materials for blending.

A still further object of the invention resides in providing a machine which will serve as a cleaner.

An object of the invention resides in providing a machine which will destroy insects, insect eggs, such as weevils or the like and remove them from the grain.

Another object of the invention resides in providing a machine which is a complete corn sheller.

A still further object of the invention resides in providing a machine which may be used for preparing materials such as nut shells, and pits from peaches, etc. for use in the plastic or other industries.

Another object of the invention resides in providing a machine for processing corn cobs, stalks and sugar cane, etc. for making furfural paper pulp and for other agricultural and industrial uses.

An object of the invention resides in providing a machine in which the vegetation is cut into short lengths to facilitate drying.

Another object of the invention resides in providing a preliminary thresher for use before heat is applied to the material being handled.

A still further object of the invention resides in providing secondary cutting means for cutting up the vegetation not fully cut up by the first named cutting means.

An object of the invention resides in providing a machine in which improperly processed portions of the material handled may be re-run to produce a resulting uniform product or products.

Another object of the invention resides in providing a stone trap for removing stones and pieces of metal from the material handled.

A still further object of the invention resides in providing an air cleaner as part of the machine for removing particles of the vegetation processed from the air prior to the discharge of the water laden air from the machine.

An object of the invention resides in providing means for relieving the air pressure in the preliminary thresher to prevent blowing the material being processed out through the feeder by conducting air from the preliminary thresher into the discharge section of the main processing chamber.

An object of the invention resides in providing means for recirculating unsaturated portions of air in order to absorb further moisture from the material handled.

Another object of the invention resides in discharging the water laden air from the end of the machine where the vegetation is introduced.

An object of the invention resides in providing air circulation in the processing chamber to keep the sieves clean.

Other objects of the invention reside in the novel combination and arrangement of parts and in the details of construction hereinafter illustrated and/or described.

In the drawings:

FIG. 16 is an elevational sectional view of the gate operating mechanism taken on line 16—16 of FIG. 1 and drawn to a greater scale.

FIG. 17 is a fragmentary sectional view taken on line 17—17 of FIG. 6.

FIG. 18 is a longitudinal sectional view of an alternate form of feeder adapted to be used with the invention.

The invention comprises a main housing A and a supplemental housing B attached to the main housing. In the supplemental housing B is installed a first processing device C and a feeder D detachably secured thereto. In the main housing A is installed a second processing device E. The first processing device C feeds the material to be processed into the main housing A where the material is further processed by the processing device E. In the main housing is further installed air circulating means F, air heating means G, an air cleaner H for moisture laden air, conveying means I for conveying screenings out of the machine and auxiliary conveying means J for conveying the finished product from the machine. Screening conveying means I remove the screenings from both processing devices and discharge the same from the machine. Auxiliary screenings conveying means J remove the finished product from the machine. Tailings conveying means K remove the processed vegetation from the processing device E. These various parts will now be described in detail.

*Housing A*

The housing A consists of a base 20, a lower section 30, and an upper section 80. These parts will now be described in detail.

Figure 3:
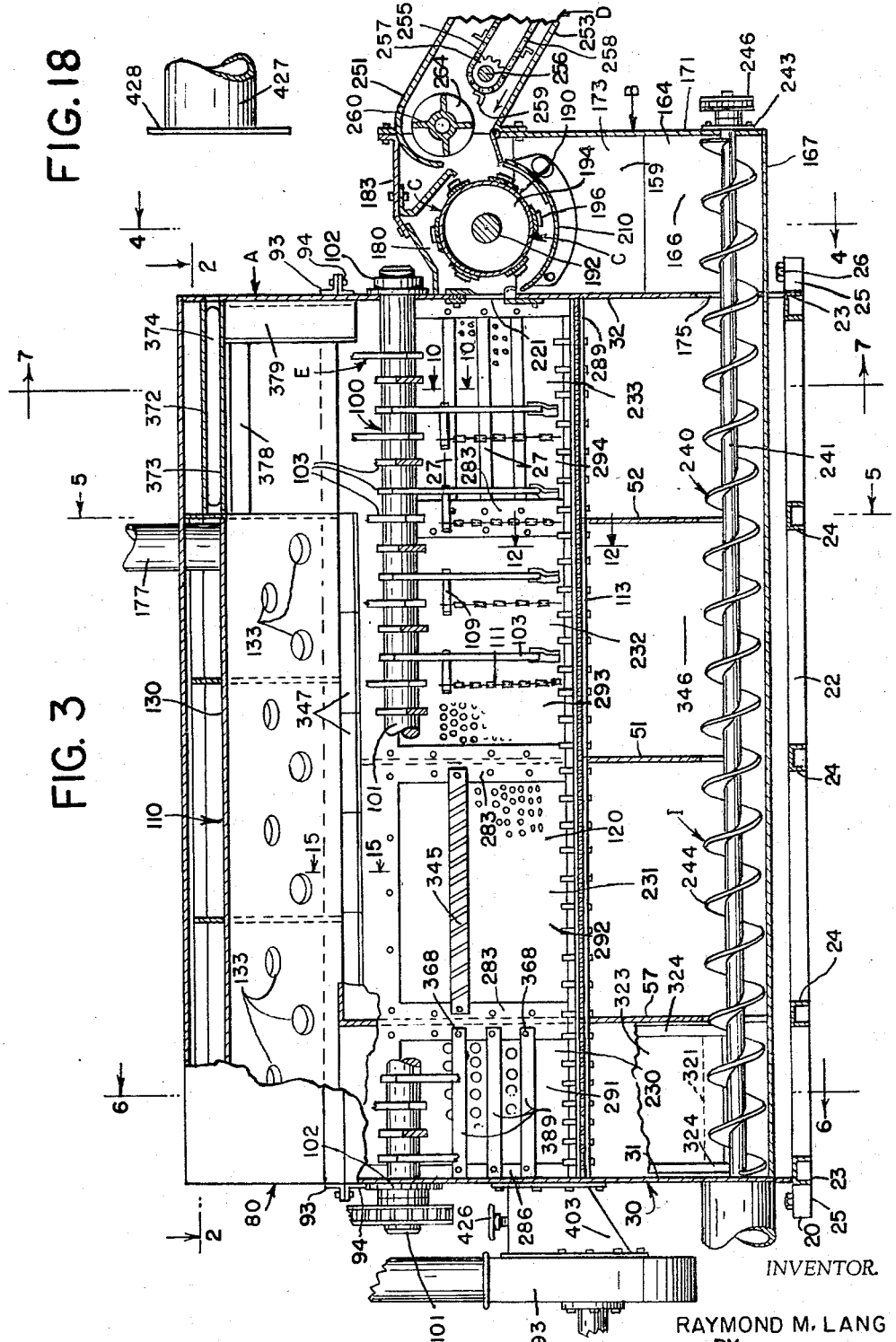
FIG. 3 is a longitudinal elevational sectional view taken on line 3—3 of FIGURE 2.
Figure 4:
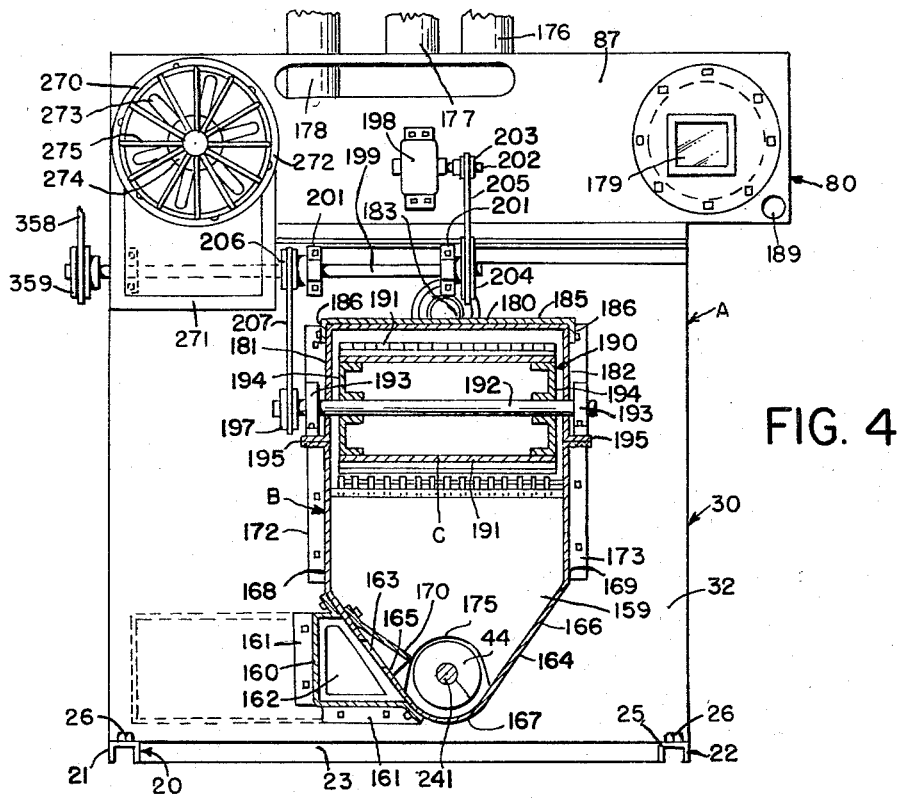
FIG. 4 is a cross sectional view taken on line 4—4 of FIG. 3.

The base 20 is constructed with two longitudinal channel shaped frame members 21 and 22 best shown in FIGS. 3 and 4 and a number of end cross frame members 23 of channel shaped construction and similar intermediate cross frame members 24. All of these frame members lie in a common plane and are welded together to form a unitary construction. The outer frame members 23 are disposed inwardly of the outer ends of the longitudinal frame members 21 and 22 to form extensions 25 and through which lag screws 26 may extend to anchor the frame to the floor of the building in which the machine is installed.

Figure 5:
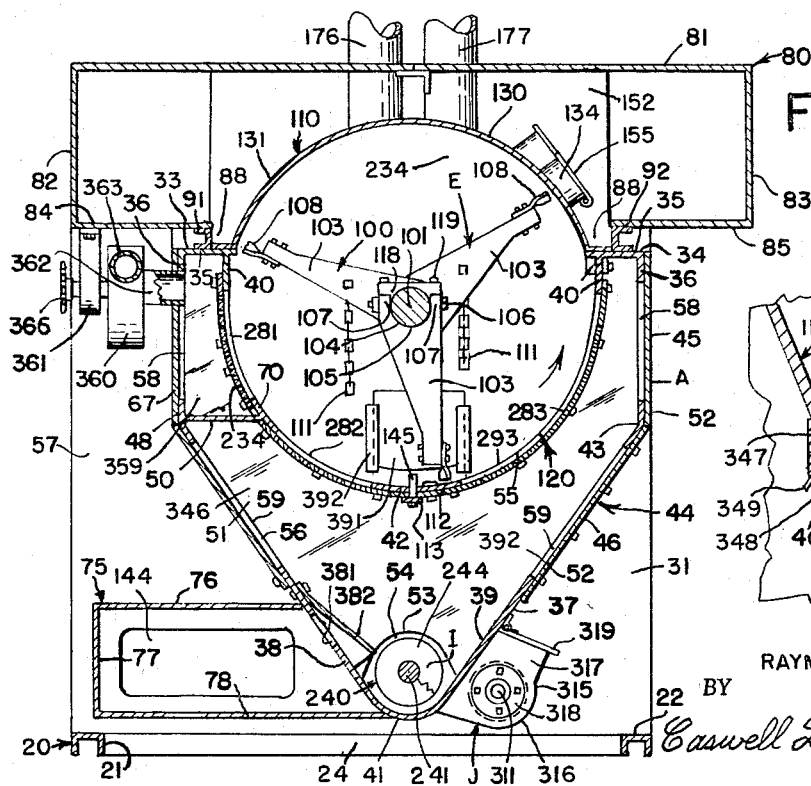
FIG. 5 is a cross sectional view taken on line 5—5 of FIG. 3.
Figure 15:
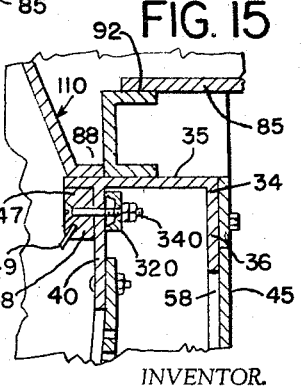
FIG. 15 is a fragmentary sectional view taken on line 15—15 of FIG. 3 and drawn to the same scale as FIG. 10.

The lower section 30 of the housing A is best shown in FIGS. 1, 2, 3, 4 and 5 and is constructed with two vertical heavy end plates 31 and 32 which are rectangular in form and which rest on the end cross frame members 23 of base 20 and which are welded thereto. Disposed between the end plates 31 and 32 are two angle members 33 and 34, FIG. 5, having flanges 35 and 36. Below these angle members is a V-shaped trough 37 having divergent sides 38 and 39 with a curved bottom 41 from which said sides issue. In addition, an arcuate plate 42 and V-shaped angle members 43 and 48 are employed which also extend between the two end plates 31 and 32. The plate has attached to the underside thereof a filler plate 112 and below that a reinforcing bar 113. All of these parts are shown in FIG. 5 and the ends of the same are welded to said end plates. Depending from the flanges 35 of the angle members 33 and 34 are plate-like hangers 40 which extend throughout the length of the housing and which are welded to the flanges 35 and to the end plates 31 and 32.

In addition to the longitudinal frame members above referred to, a shelf 50 is employed which extends throughout the length of the machine and which is welded to the end plates 31 and 32 and to the angle member 48. This shelf at its inner edge has a flange 70 welded thereto and which extends angularly therefrom both above and below said shelf.

Within the interior of the lower section 30 of housing A as best shown in FIG. 3, three partitions 57, 51 and 52 are employed which extend crosswise of the housing and fit within the upper ends of the walls 38 and 39 of the trough 37, flange 70 of shelf 50, the angle members 43 and 48 and whose lower ends 53 extend partly about the bottom of the trough 37 to form substantially circular openings 54 within the edges 53 thereof. These partitions are welded to the upper ends of the walls 38 and 39 of the trough 37 and to the angle members 43, 48, 33 and 34 and to the flange 70 of shelf 50. These partitions have arcuate openings 55 in the upper portions of the same.

Attached to the marginal portions of each of the partitions 57, 51 and 52 at the arcuate openings 55 and extending between the hanger 40 issuing from angle member 33 and the flange 70 of shelf 50 is a curved band 281, FIG. 5, which is welded to said hanger and flange and to the partition which it overlies. Similar bands 282 extend between the flange 70 of shelf 50 and the arcuate plate 42 and are welded to said flange, plate and partitions. Also curved bands 283 extend between the hanger 40 issuing from angle member 34 and the arcuate plate 42 and are welded to the same and to said partitions. All of these curved bands extend outwardly beyond said partitions on both sides thereof. Curved bands 284, 285 and 286 corresponding with the bands 281, 282 and 283 are attached to the rear end plate 31 and curved bands 287 and 288 corresponding with the bands 285 and 286 on the rear end plate 31 are disposed on the front end plate 32. These bands 284, 285, 286, 287 and 288 are welded to the end plates and to the members between which they are disposed the same as bands 281, 282 and 283. However, they extend only inwardly from said end plates.

Figure 1:
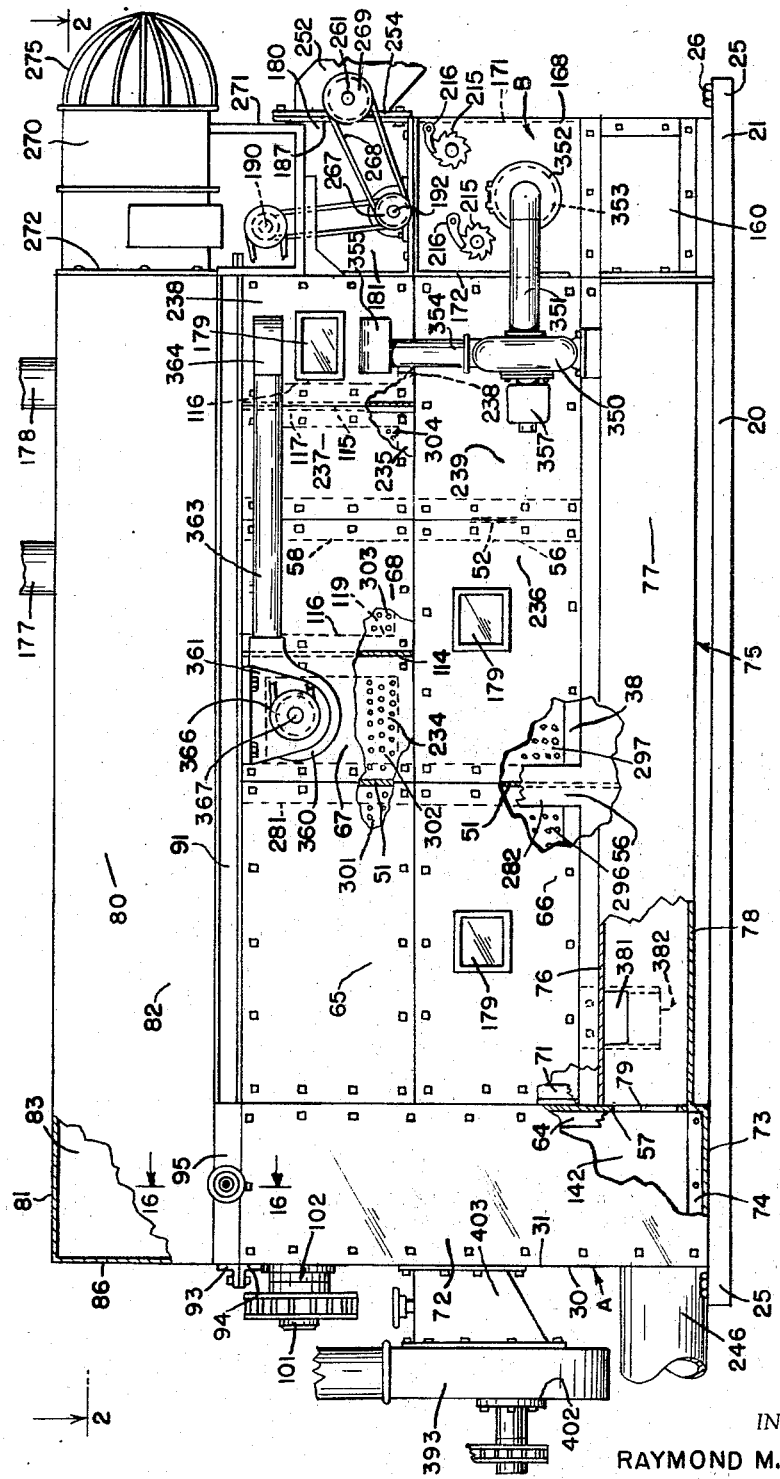
FIG. 1 is a side elevational view of a vegetation processing machine with parts cut away and illustrating an embodiment of the invention.
Figure 6:
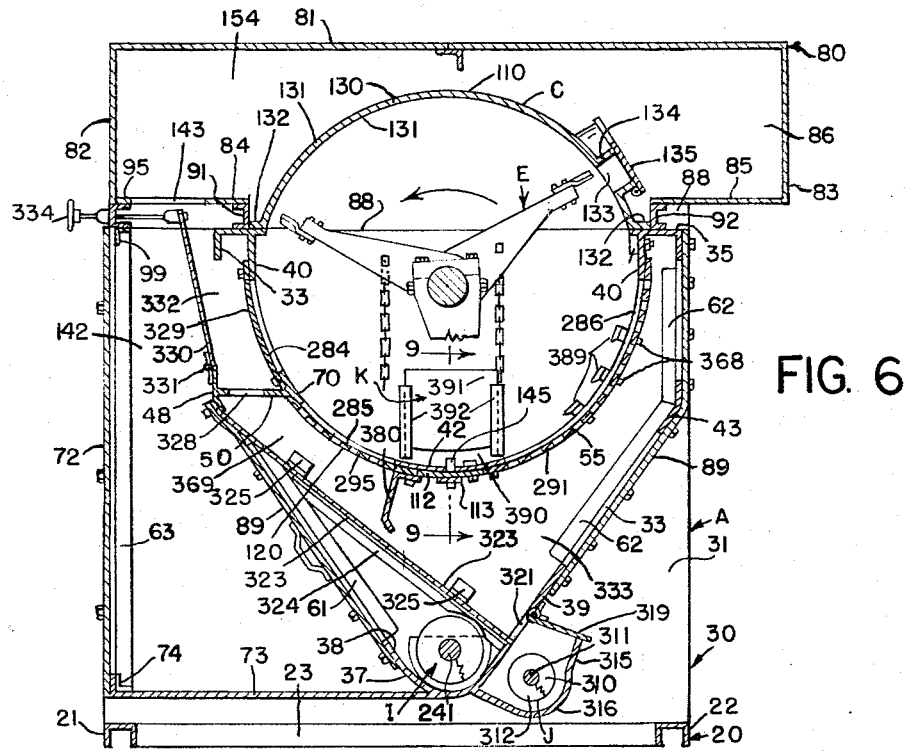
FIG. 6 is a cross sectional view taken on line 6—6 of FIG. 3.
Figure 7:
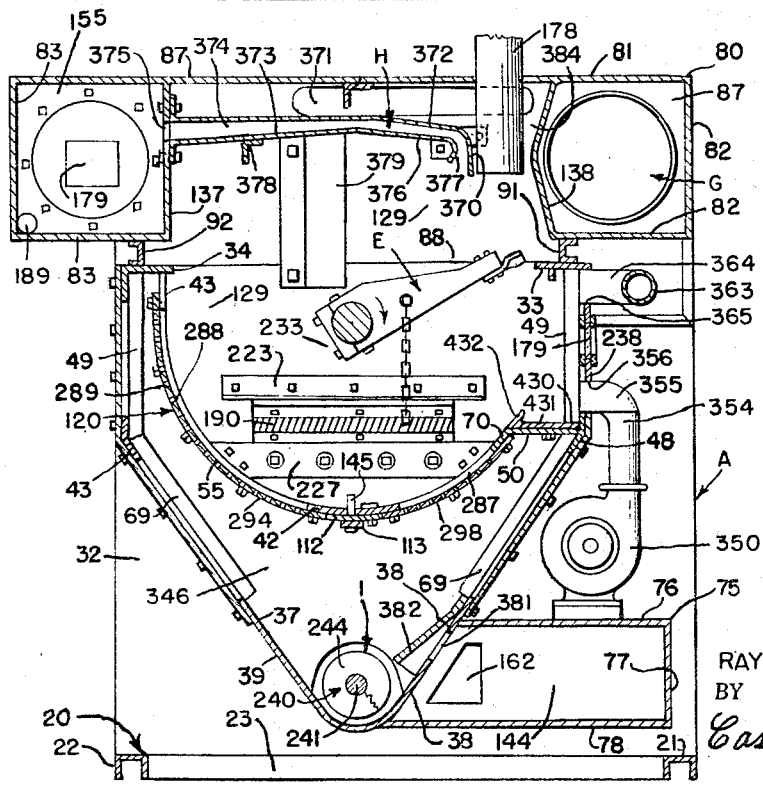
FIG. 7 is a cross sectional view taken on line 7—7 of FIG. 3.

The partitions 57, 51 and 52 have flanges 58 and 59 extending along the outer edges of the same and welded thereto and to the angle members 33, 34, 43 and 48 and to the edges of the sides 38 and 39 of the trough 37. These flanges extend outwardly from the partitions 57, 51 and 52 from both sides thereof excepting at the extended portion of partition 57 where an angle member 71 is employed, FIG. 1. The end wall 31 has secured to it as shown in FIG. 6 angle members 61 and 62. Similarly, the end wall 32 has secured to it as shown in FIG. 7 angle members 49 and 69. These angle members are disposed with their outstanding legs in the planes of the legs of the angle members 48 and 43, the sides 38 and 39 of trough 37 and the legs 36 of angle members 33 and 34. Partition 57 extends outwardly beyond the angle members 33, 48 and trough 37 to the same distance as the end wall 31. On this portion of partition 57 and on the end wall 31 and at the outer edges of the same are placed angle members 64 and 63 as shown in FIGS. 6 and 1. On the side of the partition 57 facing partition 51 and end plate 31, angle members 71 are placed with their outstanding legs corresponding with the flanges 58 and the outstanding legs of angle member 61.

In addition to the partitions 57, 51 and 52 other shorter partitions 114 and 115 are employed which extend between the shelf 50, the angle member 48 and the angle member 33 and are welded thereto. These partitions have flanges 116 and 117 similar to flanges 58 which are welded to the same. These partitions also have curved bands 119 similar to the bands 281 attached to them in the same manner. Overlying the angle member 61 on end plate 31, the angle member 71 on partition 57 facing end plate 31, the flange of angle member 48 and on the bottom 38 of trough 37 is a closure 89, FIG. 6, which is bolted thereto. Overlying the co-planar flanges of the angle members 48, 33 and 71 and the flange 56 of partition 51 is a closure 65 which is bolted therteo as shown in FIG. 1. A corresponding closure 66 is bolted to the co-planar flanges of angle members 48 and 71, the flange 56 of partition 51 and to the side 38 of trough 37. A short closure 67 is bolted to the facing flanges of the angle members 48 and 33, to the flange 56 of partition 51 and to the flange 116 of partition 114. A closure 68 in continuation of closure 67 is bolted to the flanges of the angle members 48 and 33 and to the flanges 56 and 116. Below the closures 67 and 68 is a closure 236 which is bolted to the angle member 48, flanges 56 of partitions 51 and 52 and to the wall 38 of trough 37. Another closure 237 is bolted to the angle members 33 and 48, and to the flange 56 of partition 52 and to the flange 116 of partition 115. Another closure 238 is bolted to the angle members 33 and 48, to the flange 116 of partition 115 and to the angle member 49 on end plate 32. Another closure 239 is bolted to the angle member 48, the flange 56 of partition 52, the angle member 69 on end plate 32 and the wall 38 of trough 37. On the opposite side of the machine similar closures are employed which are bolted to similar parts. These closures where shown are designated by the same reference numerals. However, since the partitions 114 and 115 are not used on the opposite side of the housing, closures 67 and 68 are made in one piece and likewise closures 237 and 238.

A door 72, FIG. 1, is bolted to the angle member 64 on partition 57 and to the angle member 63, on end plate 31. A bottom plate 73 is welded to the end plate 31, the partition 57 and the bottom of the trough 37. An angle member 74 is attached to the outer end of bottom 73 and the door 72 overlies the upstanding leg of the angle member 74 and is bolted thereto.

The upper section 80 best shown in FIG. 6 consists of a top 81, two sides 82 and 83 and which extend throughout the length of the machine. In addition, two bottom members 84 and 85 are employed which extend inwardly from the lower edges of the sides 82 and 83. These bottom members are considerably narrower than the width of the top 81 to leave an appreciable space therebetween. The top 81, sides 82 and 83 and the bottom members 84 and 85 are welded to ends 86 and 87, whose lower edges lie somewhat below the bottom members 84 and 85 to leave marginal portions 88 below said bottom members. Extending along the inner longitudinal edges of the bottom members 84 and 85 are two channels 91 and 92. These channels rest upon the legs 35 of the angle members 33 and 34 and support the upper section on the lower section. Attached to the marginal portions 88 of the ends 86 and 87 are angle members 93 which face corresponding angle members 94 secured to the end plates 31 and 32. The facing flanges of the angle members 93 and 94 are bolted together to hold the upper section 80 of the housing A secured to the lower section 30. The marginal portion 88 at the bottom member 84 extends up to the side 82 of the upper section 80 while the marginal portion 88 of the bottom member 85 extends up to the edge of the end plate 31. The angle members 93 and 94 are of a length equal to the width of the end plates 31 and 32. Attached to the bottom member 84 of the upper section, FIG. 6, is a channel 95 situated of the outermost edge of said bottom member. An angle member 99 is secured to said channel. The door 72 is bolted to said angle member.

*Supplemental housing B*

Figure 11:
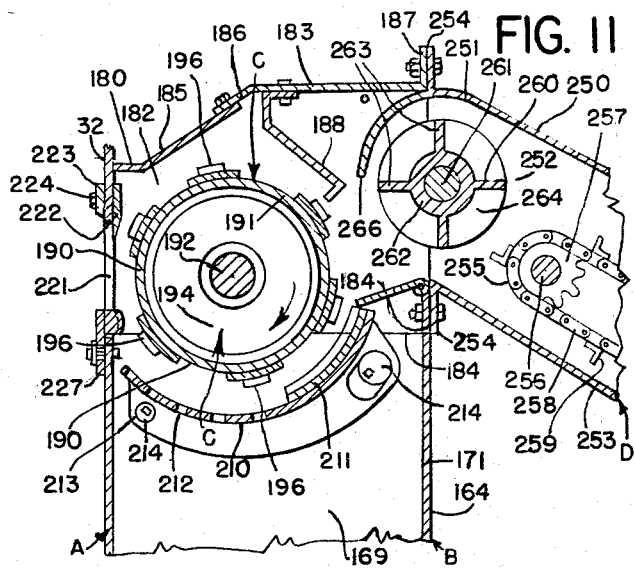
FIG. 11 is a view of a portion of the structure embodying the supplemental housing B and the structure therein, drawn to a greater scale than FIG. 3 and taken along line 11—11 of FIG. 2.

The supplemental housing B best shown in FIGS. 4 and 11 includes a trough 164 of the same size and shape as the trough 37 and welded to the end plate 32. This trough lies in continuation of the trough 37 and has diveregnt sides 165 and 166 with a curved bottom 167 therebetween. Above the sides 165 and 166 are vertical walls 168 and 169. An end wall 171 welded to the trough 164 closes the same. Extending about the inner ends of the walls 168 and 169 are outwardly etxending flanges 172 and 173 bolted to end plate 32. An opening 175 is formed in the end plate 32, the lower portion of which is flush with the curved bottoms 41 and 167 of troughs 37 and 164.

The housing B also includes a hood 180 which superimposes the trough 164. This hood comprises side walls 181 and 182, a top 185 and an end wall 184. The top 185 slopes downwardly as shown in FIGS. 3 and 11. Above the top 185 is a cover 183 which has flanges 186 overlying said top 185 and the side walls 181 and 182 and bolted thereto. The outermost end of the cover 183 has an outstanding flange 187 extending about the same.

*First processing device C*

Disposed within the interior of the housing B and at the locality of the hood 180 is the first processing device C best shown in FIGS. 4 and 11 and which includes a rotor 190 which is constructed with a drum 191 having ends 194 mounted on a shaft 192. This shaft is mounted for rotation in bearings 193 carried by flanges 195 issuing outwardly from the sides 181 and 182 of the hood 180. The drum 190 has spaced corrugated rasp bars 196 bolted thereto. The shaft 192 has a sheave 197 mounted on it. Above the hood 180 is an electric motor 198 secured to the end wall 87 of housing A and between this motor and rotor 190 is a countershaft 199 rotatably mounted in bearings 201 secured to the end plate 32 of said housing. This motor has a shaft 202 and on which is mounted a sheave 203. A belt 205 passes over this sheave and over another sheave 204 fast on the countershaft 199 and drives said countershaft. The countershaft 199 has mounted on it another sheave 206 and a belt 207 passes over this sheave and the sheave 197 on shaft 192 and drives the rotor 190.

The first processing device C further includes a concave 210 which is disposed in the housing B. This concave comprises a processing section 211 and a sieve 212. The processing section is in the form of a curved plate having upstanding ribs arranged in herringbone formation which presses the grain passing thereover. The concave has two plates 213 secured thereto which receive eccentrics 214 whose shafts extend through the side walls 181 and 182 of the supplemental housing B and have attached to them exteriorly of said walls ratchet wheels 215, FIG. 1. Pawls 216 engage said ratchet wheels 215 and hold the concave in adjusted position. Below concave 210 is formed a screenings chamber 159 into which the screenings through sieve 212 are discharged.

Within the interior of hood 180 is mounted a baffle 188 which is bolted to the cover 183 and removable therewith. This baffle lies close to the rotor 190, and is free from the side walls 181 and 182 of hood 180. This baffle reduces the amount of air reversing through feeder D.

Figure 13:
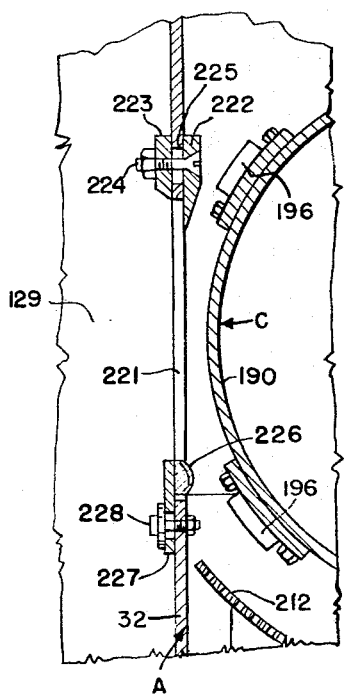
FIG. 13 is a fragmentary cross sectional view taken on line 13—13 of FIG. 2 and drawn to a greater scale than FIG. 11.

In the end plate 32 of housing A is formed a discharge opening 221 best shown in FIG. 13 and through which the vegetation processed by the first processing rotor 190 is fed into the main processing chamber 129 of housing A. At the upper edge of this opening and on the exterior of end plate 32 is a shear blade 222 which is held in adjustable position with respect to the rasp bars 196 on rotor 190. A clamping bar 223 is disposed on the other side of said end plate and directly opposite to the shear bar 222. Bolts 224 extend through said shear bar, through slotted holes 225 in the end plate 32 and through the bar 223 to clamp the shear bar 222 in position.

At the lower edge of the opening 221 is disposed a crimping rasp bar 226 which is attached to a plate 227 overlying the inner surface of end plate 32. Bolts 228 extend through said plate and through the end plate 32 to clamp the crimping rasp bar in adjusted position relative to the rasp bars 196 on rotor 190. By means of this construction, the material passing between the rasp bar 196 and the crimping bar 226 is crimped and crushed to open up the fiber in the material and to permit more rapid drying. As the crushed material reaches the shear blade 222, the material is cut off into relatively short lengths and discharged into the main processing chamber 129.

*Feeder D*

The feeder D is best shown in FIGS. 3 and 11. This feeder comprises a tubular case 250 having a top 251, sides 252 and a bottom 253. The upper end of this case is arranged on a slant and the walls thereof have flanges 254 bolted to the flanges 187 on cover 183 and to the wall 184 of supplemental housing B. Within the case 250 is mounted a drag conveyor 255 comprising a shaft 256 and on which is mounted sprocket wheels 257. Chains 258 passing around said sprocket wheels carry flights 259 closely spaced from the bottom 253 of case 250. The shaft 256 is journalled in bearings not shown and attached to the sides 252 of the case 250 and driven by a suitable source of power not shown. A similar construction supporting the chains 259 at their lower ends is also employed. Since conveyors of this type are well known in the art, the details of construction thereof have not been shown or described in this application.

Mounted in the case 250 and above the conveyor 55 is feeder beater 260. This beater has a shaft 261. This shaft is journalled in bearings, not shown, which are attached to the sides 252 of case 250. This shaft supports a hub 262 having end plates 264 secured thereto. Disposed between the end plates 264 and the hub 262 are blades 263 which are connected to said end plates and hubs. The shaft 261 is driven in any suitable manner and preferably as shown in FIG. 1 by a sheave 267 mounted on shaft 192 and a belt 268 passing about said sheave and about another sheave 269 mounted on shaft 261. Shafts 261 and 192 travel in the same direction and the blades 262 of feeder beater 260 beats the material carried by conveyor 255 and kicks it against rotor 190 which processes the same and feeds it into the housing A through opening 221 in the end plate 32 thereof. To prevent the material handled by feeder beater 260 from traveling around with said beater an arcuate deflector 266 is employed which is attached to top 251 of case 250.

If desired, vegetation such as alfalfa and capable of being conveyed by blowing may be introduced into the first processing device C. For the purpose the feeder D is removed by unbolting the same from housing B and substituting another feed device shown in FIG. 18. This feed device comprises a pipe 427 and into which the vegetation may be blown by any suitable means not shown. A flange 429 extending about the opening in pipe 427 and attached thereto may be bolted to the housing B instead of the feeder D.

*Second processing device E*

Disposed within the housing A is a rotor 100 best shown in FIGS. 3 and 5 and which forms part of the processing device E. This rotor comprises a shaft 101 which is journalled in bearings 102 secured to the end plates 31 and 32. Mounted on the shaft 101 are spaced arms 103 which are formed with slots 104 having rounded ends 105. These slots form finger 107 which straddle the shaft 100 when the shaft is received in the slot. The shaft 101 butts up against the said arms at the rounded portions 105 of the arms at the end of said slots. Bolts 106 extend through said fingers and shaft and hold the arms attached to the shaft. Caps 118 overlying the shaft 101 and attached to the fingers 107 by cap screws 119 prevent the arms 103 from being thrown outwardly by centrifugal force in the event the bolts 106 are sheared. The arms 103 are spaced apart angularly with respect to the adjacent arm 120 degrees, placing each third arm in a position directly back of or forward of the first arm. The arms 103 have blades 108 bolted to the ends of the same and which are arranged on a skew, certain of the blades being skewed in the same direction.

The arms 103 have attached to them on one side thereof bosses 109 and to which are secured chains 111. These chains when shaft 101 is rotated extend outwardly from the axis of the shaft 100 substantially the same distance as the blades 108, FIG. 12. By means of this construction disclosed, the blades and chains are easily removed for replacement or for different performance when the occasion requires it.

Surrounding the rotor 100 is an enclosure 110 best shown in FIGS. 3, 5, 6 and 7 which comprises a concave 120 and an arcuate top 130. The concave 120 includes the arcuate plate 42, the hangers 40, the flange 70 of shelf 50 and the curved bands 281, 282, 283, 284, 285, 286, 287 and 188. Carried by these parts are sieves 291, 292, 293 and 294 which are bolted to the hangers 40 attached to angle member 34 and plate 43. These sieves are also bolted to the curved bands 283 on partitions 57, 51 and 52 and to the curved bands 286 and 288 on the end plates 31 and 32. In addition, similar sieves 295, 296, 297 and 298, FIG. 1, are bolted to the flange 70 on shelf 50 and to the arcuate plate 42. These sieves are further bolted to the curved bands 282 on partitions 57, 51 and 52 and to the curved bands 285 and 287 on the end plates 31 and 32. Lastly, four sieves 301, 302, 303 and 304 are bolted to the hanger 40 on angle member 33 and the flange 70 on shelf 50. These four sieves are also bolted to the curved bands 119. Extending across the hanger 40 on angle member 33 and the flange 80 of shelf 50 and overlying the curved band 285 on end plate 31 and curved band 282 on partition 57 is a solid curved plate 329. Below the concave 120 is formed a supplemental processing chamber 346.

The top 130 of the enclosure 110 comprises a semi-cylindrical shell 131 which is formed with flanges 132 overlying the legs 35 of the angle members 33 and 34 and bolted thereto. This shell has inlet openings 133 surrounded by necks 134 as shown in FIG. 6. These necks are adapted to be covered by lids 135 hingedly connected to said necks and adapted to be moved into opening or closing position to permit of the flow of air into the processing chamber 129. Both the top 130 and the concave 120 extend throughout the length of the machine and the shell 131, the sieves 291 through 299, the sieves 301, 302, 303 and 304 and the plate 289 are curved and are concentric with the axis of the shaft 101. The space within the enclosure 110 and concave 120 is the main processing chamber 129 of the invention. This chamber is divided into four sections 230, 231, 232 and 233. Section 230 extends from end plate 31 of housing A up to the partition 57. Section 231 extends from partition 57 to partition 51. Section 232 extends from partition 51 to partition 52 and section 233 extends from partition 52 to end plate 32 of housing A.

Figure 14:
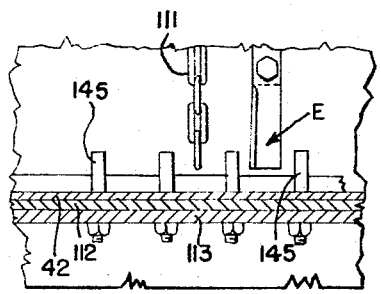
FIG. 14 is a fragmentary sectional view taken on line 14—14 of FIG. 12.
Figure 12:
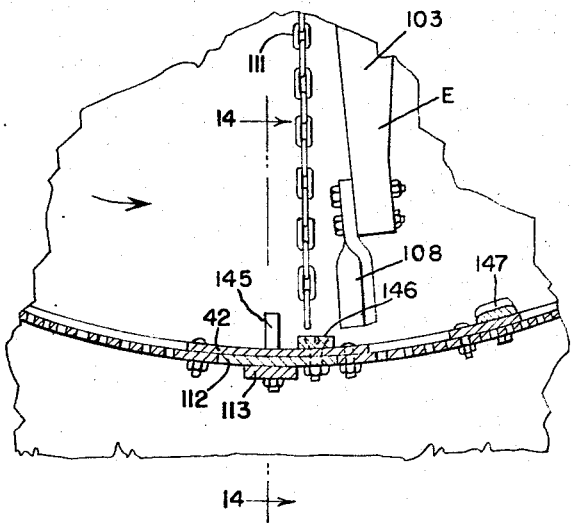
FIG. 12 is a fragmentary sectional view taken on line 12—12 of FIG. 3 and drawn to a greater scale than FIG. 7.

For cooperation with the chains 111 and the blade 108 of rotor 100 as shown in FIGS. 12 and 14 are a series of teeth 145 which are bolted to the curved plate 42, the filler plate 112 and bar 113. Adjacent these teeth is disposed a cutter bar 146 and which is bolted to plate 42 and filler plate 112.

On the sieves 291, 292, 293, and 294 are bolted rasp bars 147 which are disposed near the cutter bar 146. Also attached to the curved bands 283 in section 231 is another rasp bar 345 which is closer to the upper end of the sieve 292.

Figure 10:
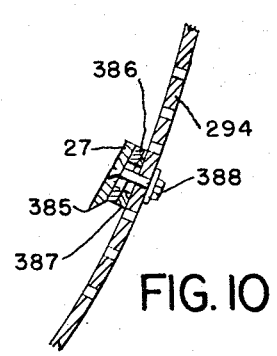
FIG. 10 is a fragmentary sectional view taken on line 10—10 of FIG. 3 and drawn to a greater scale than FIG. 3.

In section 233 of chamber 129 are mounted three shear blades 27 which are shown in detail in FIG. 10. These shear blades have sharpened edges 385 which are disposed on the lower sides of said blades and with the bevel thereof facing the sieve 294. These blades are spaced from said sieve by means of spacers 386 and tapered shims 387 located at the ends of said blades. Countersunk bolts 388 extending through the sieve 294, the shims 387, spacer 385 and the blades 27 hold the blades attached to said screen with space therebetween for the passage of the cut portions of the vegetation to pass through.

In the section 230 of chamber 129 are three shear blades 389 which overlie the sieve 291 and are spaced therefrom in a manner similar to that shown in FIG. 10. Countersunk bolts 368 extend through the said blades, the curved bands 286 and the spacers therebetween and hold said blades attached to said bands and in spaced relation to the sieve 291.

*Air circulating system F*

Figure 2:
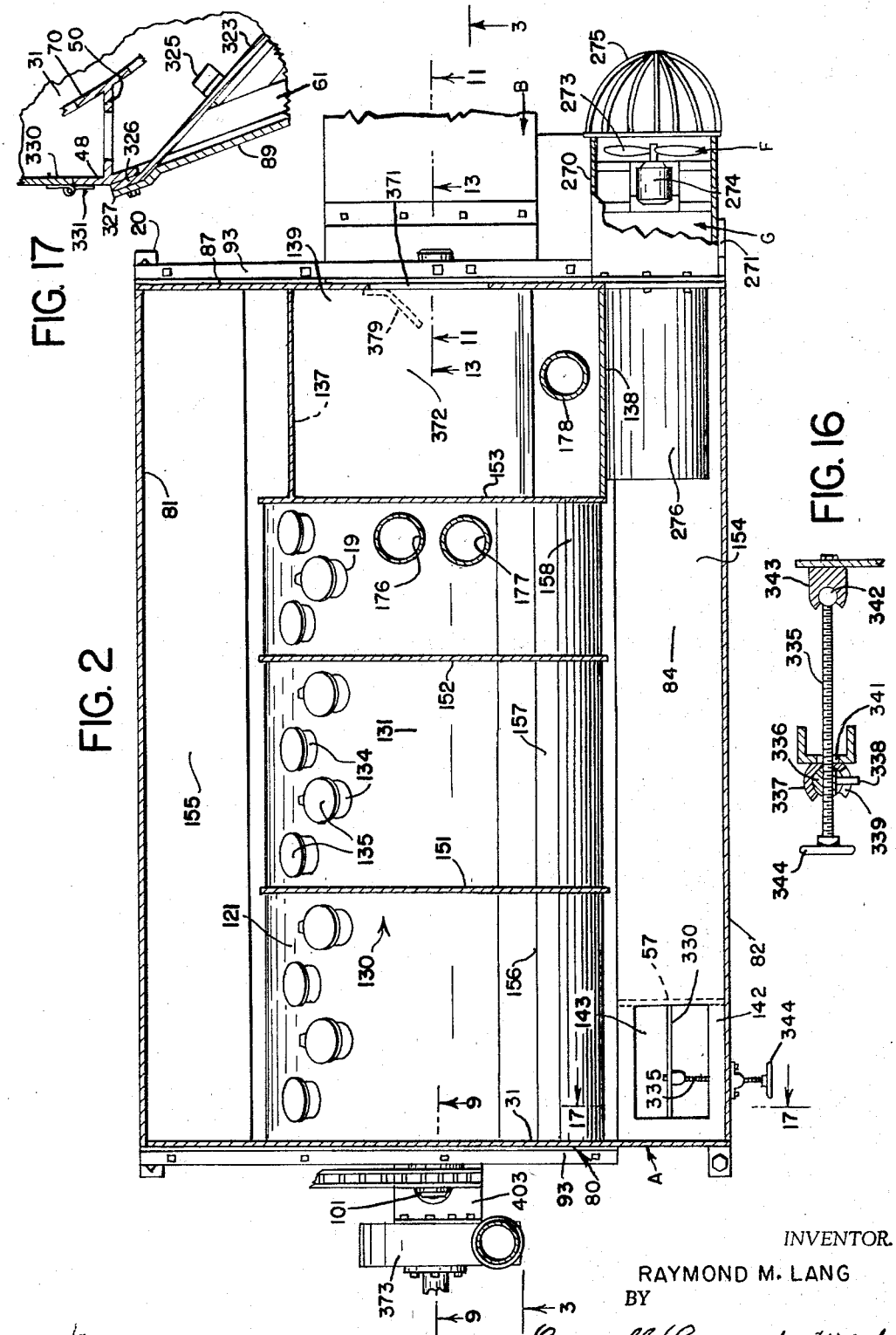
FIG. 2 is a plan sectional view of the machine taken on line 2—2 of FIG. 1.

The air circulating system F of the invention includes a case 270, FIGS. 1, 2 and 4, located adjacent the forward end of housing A and opposite the end plate 32 thereof. This case and enclosed structure is supported on a frame 271 attached to the end wall 87 of upper section 80 of housing A. The case 270 has a flange 272 which is bolted to the end wall 87 of said upper section. In the case 270 is mounted a fan 273, FIG. 2, driven by a motor 274. A guard 275 on the outer end of the case 270 protects the fan and forms an inlet for the air entering the interior of the housing A. The case 270 has a duct 276 attached thereto and which extends into the interior of the housing A and directs air into a chamber 154 disposed in the space defined by the top 81, side 82 and bottom member 84 of the upper section 80. This chamber serves as a plenum chamber and from which air is delivered to the various parts requiring air.

In the space between the top 81 of the upper section 80 of housing A and the shell 131 of top 130 are three dividers 151, 152 and 153 which divide the space above the shell 131 into the longitudinal plenum chamber 154 and a longitudinal passageway 155 extending from one end plate to the other and three cross passageways 156, 157 and 158. The passageways 156, 157 and 158 all communicate with the plenum chamber 154 and the passageway 155. Between the divider 153 and the end plate 32 are two longitudinal walls 137 and 138. These walls issue upwardly from the bottom members 84 and 85 of the upper section 80 of housing A and extend to the top 81 thereof. These walls form a space 139 between said walls and below the top 81 of housing A and communicating with the processing chamber 129.

Extending along the side 38 of the trough 37 is a duct 75. This duct has a top 76, a side 77 and a bottom 78. The bottom 78 is wider than the top 76 and is welded throughout its length to the bottom 41 of the trough 37. Similarly, the top 76 is welded throughout its length to the side 38 of said trough. The duct 75 extends from the partition 57 to the end plate 32 and the ends of the top, side and bottom of the same are welded to said partition and end plate. Duct 75 has a passageway 144 extending along the same. A hole 79 in the partition 57 brings the passageway 144 through said duct into communication with the space between said partition and end wall 31.

Between the end plate 31 and the partition 57 and between the door 72, the closure 89 and side 38 of trough 37, bottom 73 and bottom 84 of the upper section 80 is formed a vertical passageway 142 communicating with chamber 154 through an opening 143 in bottom 84 of the upper section 80 as best shown in FIG. 6. The passageway 142 also communicates with the passageway 144 in duct 75 best shown in FIG. 7.

Air is directed into the chamber 159 in housing B below rotor 100 and at the lower portion of the same by means of an elbow 160. This elbow has flanges 161 which are bolted to the side 165 of housing B and to the end plate 32. An opening 162 in the end plate 32 and on opening 163 in the wall 165 conducts air from passageway 144 in duct 75 through opening 162, through elbow 160 and through opening 163 and into chamber 159. Opening 163 is partially covered by a deflector 170 similar to the deflectors 382 used with openings 381.

The air circulating means F includes a blower 350 best shown in FIG. 1 which is mounted on the top 76 of duct 75. The intake of this blower is connected by means of a pipe 351 attached to a cover 352, covering an opening 353 in the vertical wall 168 of auxiliary housing B. The outlet of this blower is connected by means of a pipe 354 to a discharge head 355 which communicates with section 233 of processing chamber 129 through an opening 356 in closure 238. Blower 350 is driven by a motor 357. This blower removes the water laden air from the chamber 159 below concave 210 of the first processing device C and relieves the pressure therein.

Air circulating means F further includes a blower 360 which is carried by a bracket 261 best shown in FIG. 5. This bracket is secured to the bottom member 84 of the upper section 80 of housing A. The inlet of this blower is connected by means of a pipe 362, which extends through closure 67 and communicates with the space 359 between the sieve 234 and the closure 67. The outlet of said closure is connected to a pipe 363, FIG. 5, which in turn is connected to a discharge head 364. This head communicates with section 233 of processing chamber 129 through an opening 365 in the closure 238. Blower 360 is driven by means of a belt 358 passing over a sheave 266 mounted on the rotor shaft 367 thereof and a sheave 359 on countershaft 199. This blower removes the partly saturated air in section 232 of processing chamber 129 and returns it to section 233 for further use.

At the upper edge of angle member 48 is mounted a gate 330, FIGS. 2, 6 and 17, which is hingedly connected thereto by means of a hinge 331. This gate extends between the end plate 31 and the partition 57 and above the plane of joinder of the upper and lower sections of housing A. When said gate is in the position shown in FIG. 6, air from the plenum chamber 154 may pass through opening 143 in the bottom 84 of upper section 80 of housing A and through the passageway 332 disposed between the solid plate 329 on concave 120 and the gate 330. From this passageway air passes through opening 328 in shelf 50 and enters a chamber 333 disposed above slide 323 and closure 89 and from which it passes through the sieves 295 and 291 of the concave 120.

The gate 330 may be moved into and held in adjusted position to vary the amount of air entering passageway 332 by means of an adjusting device 334 shown in detail in FIG. 16. This device includes a screw 335 which is screwed into a threaded nut 336. This nut is in the shape of a ball and is received in a socket 337 attached to channel 95 on the exterior thereof. A pin 338 issuing outwardly from the nut 336 and operating in a slot 339 in socket 337 restrains rotation of said nut. The screw 335 extends through a slot 341 in the web of channel 95 and terminates short of the gate 330. At the inner end of the screw 335 is provided a ball 342 and a socket 343 which is attached to the gate 330. Screw 335 has a hand wheel 344 attached to its outer end and by means of which said screw may be rotated to vary the amount of air entering the chamber 333.

Air from passageway 144 in duct 75 is conducted into the supplemental processing chamber 346 and to the various sections of said chamber by means of openings 381 in the side 38 of the trough 37. Deflectors 382 overlie these openings and direct the air downwardly and against the conveyor 240. This stirs up loose particles of vegetation and causes them to circulate in the sections thereof where the heat from the air in said sections further dries the vegetation.

Moisture laden air is discharged from section 233 of chamber 129 through an opening 371 serving as an air outlet best shown in FIG. 7 which is formed in the end 87 of the upper section 80 of housing A and which is located immediately below the top 81 of said housing A.

Heating means G

The air circulated by fan 273 is heated by the heating means G. This heating means may be of any construction suitable for the purpose and has not been shown or described in detail in this application. A heater burning propane gas has been found desirable. The said heating means is enclosed in a duct 276 and heats all of the air delivered by fan 273 and discharged into plenum chamber 154.

Air cleaner H

The air cleaner H shown in FIGS. 2, 3 and 7 utilizes a plate 372 which is disposed directly below outlet 371 and which extends inwardly into chamber 129 at section 233 thereof. This plate extends from the end 87 of section 80 of housing A and to the divider 153 and is bolted to said end divider and to the wall 137. Directly below the plate 372 is another plate 373 which is spaced from the plate 372 to form a passageway 374 therebetween. This plate is also bolted to the end 87 of section 80 of housing A, to the divider 153 and to the wall 137. In the wall 137 is formed an opening 375 which brings the clean air entering the passageway 155 into passageway 374. At the end of plate 372 is a deflector 370 which directs the air discharged from passageway 374 into the moisture laden air circulating with rotor 100 in chamber 129.

Cooperating with the deflector 370 is another deflector 377 which is formed on the downturned end 376 of plate 373. Another deflector 378 is also employed which is welded to the under surface of plate 373. A still further vertical deflector 379 is also employed which is bolted to the end 87 of section 80 of housing A and to the end plate 32 of section 233 of said housing. These deflectors cause the solid material in the moisture laden air to separate therefrom to permit clear air being discharged from outlet 371.

Screenings conveying means I

Figure 8:
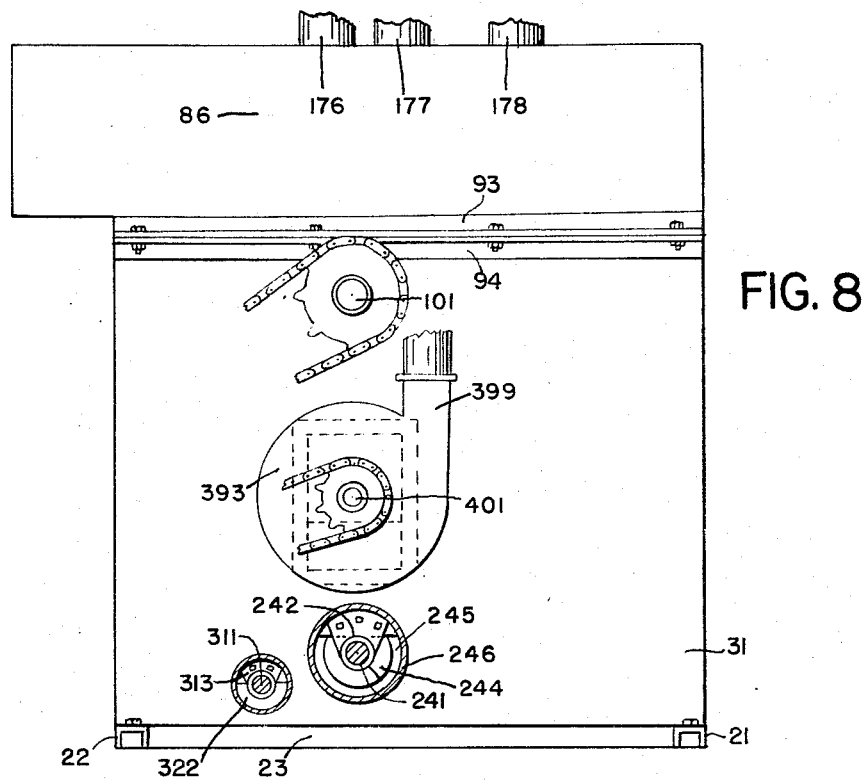
FIG. 8 is an end elevational view of the machine viewed from the discharge end of the machine.

In the trough 37 and extending through opening 175 in end plate 32 and into the trough 164 is a screw conveyor 240. This conveyor includes a shaft 241 which is rotatably mounted in bearings 242 and 243, FIGS. 3 and 8. On this shaft is mounted and helical conveyor flight 244 which extends from the end wall 171 of supplemental housing B and to the end plate 31 of housing A. The shaft 241 has mounted on it a sprocket wheel 246 by means of which it is rotated. Formed in the end plate 31 is a discharge opening 245 which conducts screenings from the trough 37 and into a duct 246 welded to the end plate 31.

Within the screenings chamber 346 of the housing A adjacent end plate 31 is disposed a short conveyor 310 best shown in FIG. 6. This conveyor includes a shaft 311 on which is mounted a screw flight 312. Enclosing said conveyor is a housing 315 including a circumferential wall 316 which is welded to the side 39 of trough 37 and to the end plate 31 of housing A. An end wall 317, FIG. 5, is attached to the circumferential wall 316 by welding. Shaft 311 is journalled in a bearing 313 attached to the end plate 31 and in a bearing 318 attached to the end wall 317 of housing 315. The housing 317 is open at the top and closed by a cover 319 hinged to the side 39 of trough 37. An inlet opening 321 is formed in side 39 of trough 37 and an outlet opening 322 is formed in the end plate 31.

The screenings from sieves 295 and 291 in section 230 are discharged into a passageway 369 and upon an inclined slide 323 which extends across the space between end plate 31 and partition 57 as shown in FIGS. 6 and 17. This slide extends from the angle member 48 to the side 39 of trough 37 and engages said side at the locality of the bottom of the inlet 321 to conveyor 310. The screenings from the sieves in section 230 which are deposited on said slide and side are discnarged into conveyor housing 315 and discharged by conveyor 310 through the outlet 322. The slide 323 is supported on angle members 324 attached to the end plate 31 and partition 57 and held in position thereon by means of clips 325. The upper end of the slide 323 has a lip 326 formed on it, FIG. 17, which overlies the lower flange of angle member 48. Closure 89 which is attached to the angle members 61 on end plate 31 and partition 57 has an offset 327 which overlies the lip 326 and holds the slide 323 in position. A baffle 380 bolted to filler plate 112 reduces the area of the passageway 369 for the screenings from sieve 295 and creates a pressure in said passageway which blows air through sieve 295 and lifts the straw in section 230.

Tailings conveying means K

Figure 9:
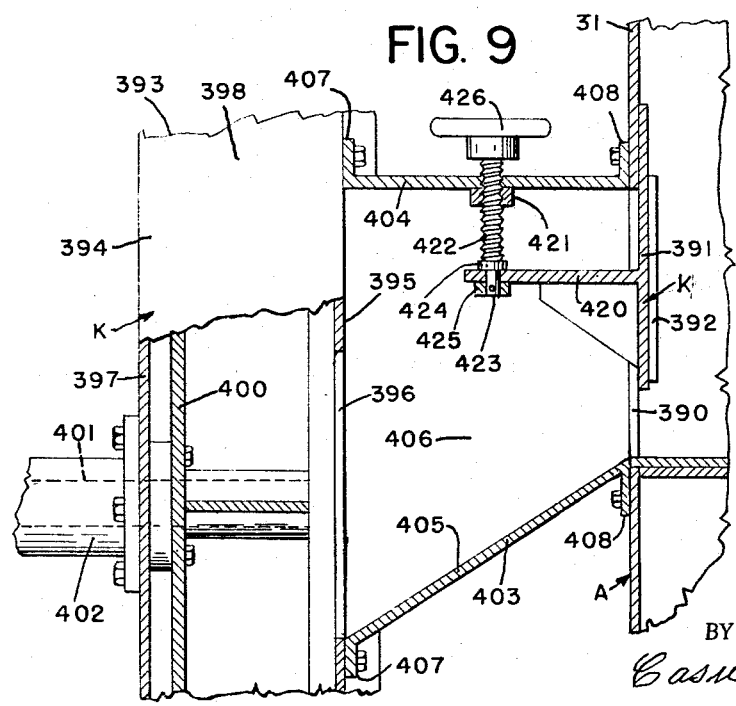
FIG. 9 is a fragmentary sectional view of the machine drawn to a greater scale than FIG. 2 and taken on line 9—9 of FIG. 2.

The material leaving the processing chamber 129 is discharged through an opening 390 in the end plate 31 as best shown in FIG. 6. This opening may be varied in area by means of a gate 391 slidably mounted in guides 392 attached to the end plate 31 upon the interior thereof as seen in FIG. 9. A blower 393 is employed having a case 394 provided with an inner wall 395 having an inlet opening 396 therein. Said case further has an outer wall 397 and a connecting wall 398 therebetween. These walls form a discharge duct 399 whereby the vegetation fed into the blower may be discharged therefrom. Within the case 394 is disposed a rotor 400 which is carried by a shaft 401. This shaft is journalled in a bearing 402 secured to the wall 397 of case 394.

Disposed between the blower 393 and the end plate 31 of housing A is a duct 403. This duct has an upper wall 404, an inclined lower wall 405 and side walls 406. Flanges 407 and 408 issuing outwardly from these walls are bolted to the wall 395 of blower 393 and to the end plate 31. Flange 408 extends about the opening 390 in end plate 31 and flange 407 extends about an inlet opening 396 in the wall 395 of blower 393.

Attached to the gate 391 as shown in FIG. 9 is a bracket 420 which extends inwardly into the interior of the duct 403. Immediately above this bracket is disposed a nut 421 which is welded to the underside of the upper wall 404 of said duct. A screw 422 extends through said wall and is screwed into said nut and has a reduced end 423 which passes through bracket 420. Collars 424 and 425 secured to said screw restrain longitudinal movement of the screw relative to said bracket but permit rotational movement of the screw relative thereto. A hand wheel 426 on the outer end of said screw serves to rotate the screw. Rotation of said hand wheel causes raising or lowering of the gate 391 to prevent air from being discharged through the opening 390.

Miscellaneous

Extending through the top 81 of the upper section 80 are three pipes 176, 177 and 178. The two pipes 176 and 177 are located in section 232 of chamber 129 and pass through the arcuate top 130 of enclosure 110 and thus communicate with said chamber. The pipe 178 is located in section 233 of chamber 129 and communicates directly therewith, there being no arcuate top for said chamber in this section.

For the purpose of the operation of the machine a number of inspection windows 179 are employed which are located at strategic positions in the machine. These windows are of conventional construction and may be opened if desired.

A stone trap 430 is employed which is used for removing stones and pieces of metal and other similar foreign matter. This stone trap is located in section 233 of processing chamber 129 and utilizes the shelf 50. On the shelf 50 is mounted a plate 431 which has at its inner edge an upturned lip 432. As will be noted in FIG. 7, there is no sieve between shelf 50 and angle member 33 so that objects such as stones or pieces of metal are thrown by centrifugal force outwardly and deposited on the plate 431. The lip 432 prevents the stones from rolling back into chamber 129. The two discharge headers 355 and 364 discharge the air from blowers 350 and 360 into section 233 of chamber 129 and blow the vegetation back into said chamber for further processing and to separate the same from such objects. Between the two headers 364 and 355 one of the windows 179 is located and through which the material collected on plate 431 is removed.

To aid in drying, the husks are opened up by means of nippers 347 which are disposed in the angle between hanger 40 and the legs 35 of angle members 34. These nippers comprise a bar 348 slatted to receive a blade 349 projecting angularly outwardly therefrom. The bars 348 are bolted to hanger 40 by means of bolts 340 which extend through bars 348, hanger 40 and a backing member 320.

For the purpose of preventing injury to the machine in the event of pressure created in the machine by combustion of some of the products in the machine, a vent hole 189 is employed in the end wall 87 of housing A bringing the interior of the housing at the locality of passageway 155 into communication with the exterior.

The operation of the invention is as follows:

Assume that wheat cut close to the ground with the kernels ripe but the stems and husks partly green are to be processed. The cut vegetation is fed to the feeder D and the drag conveyor 255 brings the same up to the feeder beater 260. This feeder feeds the cut vegetation into the space between the concave 210 and the rotor 190. Any heads of the grain which are sufficiently dry will be threshed and the grain passed through the sieve 212 and to the conveyor 240 and by which they are progressed along the machine. The remaining vegetation is engaged by the rasp bar 226 partly processed to prepare the wheat heads for further threshing. When the vegetation reaches the shearing blade 222, the stems are cut up into lengths suitable for further processing in the machine. The vegetation is then discharged into section 233 of the processing chamber 129 through opening 221. Certain of the lids 135 for openings 133 in the arcuate top 132 of enclosure 110 in sections 230 and 231 of chamber 129 will have been opened to admit hot air from plenum chamber 155 into the chamber 129. The greener the vegetation the more openings will be uncovered to increase the amount of hot air for drying the same. This will cause the air in chamber 129 to move toward the end plate 32 and be discharged through the outlet 371. The chains 111 serve as flays and drive the vegetation between the teeth 145 and beat the same against said teeth, the cutter bars 146 and the rasp bars 147. This serves to flay, scarify and reduce the stems and husks by attrition and to thresh the grain from the same while being dried by the hot air delivered into chamber 129. The threshed grain passes through the various sieves forming part of the concave 120. The twisted blades 108 moves the vegetation along the concave 120 and direct the same to the chains 111 which in addition to flaying the same causes the vegetation to go into suspended orbit. While suspended the vegetation is dried by the hot air in chamber 129 and passes the teeth 145, cutter bar 146 and rasp bars 147. In so moving, the various sieves are cleaned. As the vegetation is dried the same is repeatedly threshed when passing teeth 145, cutter bar 146 and rasp bars 147 and the finer foul seeds discharged through the sieves of concave 120 in sections 231, 232 and 233 and are deposited into chamber 346. When the threshed grain reaches section 230, the same passes through the sieves in said section which have larger openings and is discharged upon the slide 323 and discharged by conveyor 310 from the machine.

Baffle plate 380 in chamber 129, section 230, partly closes area of passageway between slide 323 and baffle plate 380 allowing air to pass through sieve 295 with more force lifting and putting a cushion of air under the dried vegetation allowing the wheat or grains to fall freely through sieves aiding suction blower 393 to suck in the remaining dried vegetation through entrance opening 390 in end plate 31 of housing A where it travels through duct 403 and into blower 400 and is discharged for agricultural or industrial by-products.

Grain which has been threshed and the chaff and foul seeds which have passed through sieve 212 into large size slowly revolving conveyor 240 in screening chamber 346 are dried by the heated air therein while being conveyed through the machine. This material will be discharged into a conventional grain cleaner not shown where the chaff, foul seeds and objectionable material will be removed from the grain. From this cleaner the grain will be returned into section 232 in main processing chamber 129 by a blower not shown, through pipe 176 for further drying and processing if required.

In addition to the action of the rasp bars 147 and teeth 145, another rasp bar 345 is employed which further assists in threshing the grain. As the vegetation is processed, the heads are engaged by the nippers 347 and the husks opened up for more thorough drying.

Hot air coming out of plenum chamber 154 passes through openings 381 in side 38 of trough 37 and is discharged into chamber 346. The air so discharged is deflected down at vegetation between the wall and conveyor 240 by means of deflectors 382. These deflectors are spaced at intervals throughout the length of the machine. The vegetation is forced into suspension by the high pressure hot air and moves slowly in a curved fashion up and down from deflector to deflector allowing each particle to be dried while surrounded by hot air.

Since the vegetation being processed is introduced in section 233 of chamber 129, the same contains the most moisture and the air in this section contains the most moisture. Air outlet 371 is hence located at the upper end of end wall 87 of housing A. To remove the particles of processed vegetation suspended in the air in section 233 from being blown out of the machine with the exhausted air the air cleaner H is employed. This cleaner blows a sheet of air against the outgoing air which drags with it the free suspended particles and discharges them back into section 233 where they are removed as previously described. In certain uses of the machine where large quantities of air are required either or both of the closures 68 and 237 may be opened to allow the escape of the air through the sieves 303 and 304.

When corn is to be processed, suitable sieves are substituted for those use for grain such as would be necessary to produce the desired results. Also, the concave 210 of the first processing device is dropped to permit the cobs to enter the space between said concave and rotor 190. The stalks with cobs attached are then fed to conveyor 255 with the cut ends first and passed through said first processing device. During its passage through the same, the kernels of corn are shelled from the cobs and the stalks with cobs attached are cut by the blade 222 into desired lengths and fed into the processing chamber 129. When entering the same the stalks and cobs are treated with hot air, flayed, broken up and cut into lengths, sliced into desired widths and discharged from the machine.

Alfalfa may also be treated in the machine. In processing device C the vegetation is ripped and gnarled. In processing device E the stems are cut into desired lengths and dried and are then further processed.

Where straw is desired for bedding, the rasp bar 226 and attaching means may be removed and also the shear bar 146 and cutter blades 27 and 389 depending on the size of bedding desired.

Weevil may also be removed from threshed grain by blowing it or conveying it to the pipe 178 where it is directly discharged into section 233 of processing chamber 129. The heated air burns up the weevil and its eggs without injuring the grain.

Many other uses may be found for the machine. The machine may be used as a corn cob stalk husker and shredder, a corn on the cob crusher for making corn cob mix for beef cattle feed, a sugar cane and sugar beet processing machine, a waste fruit and vegetable processing machine and a potato processing machine.

The advantages of the invention are manifest. Numerous operations may be performed by the machine and particularly those requiring air and heat. Ripened grain and other vegetation may be harvested while the stems or stalks are green or damp and in the instant invention threshed and the stems reduced to sizes and degrees of dryness suitable for animal and industrial use or storage.

Changes in the specific form of the invention, as herein described, may be made within the scope of what is claimed without departing from the spirit of the invention.

Having described the invention, what is claimed as new and desired to be protected by Letters Patent is:

1. A vegetation processing machine comprising:
   (a) enclosing means forming a processing chamber cylindrical in form, including
   (b) a substantially arcuate sieve,
   (c) a processing device within said chamber including
   (d) a shaft coaxial with said sieve,
   (e) a number of flexible flays longitudinally spaced and secured to said shaft,
   (f) means for rotating said shaft and causing said flays to extend outwardly therefrom with portions thereof traveling in proximity to said sieve,
   (g) a number of arms secured to the shaft and disposed between certain of said flays,
   (h) means on said arms traveling in proximity to said sieves and adapted to progress the vegetation engaged thereby toward the path of movement of an adjoining flay,
   (i) means for conducting air into said chamber to contact the vegetation therein and extract moisture therefrom,
   (j) means for heating said air,
   (k) means for feeding the vegetation into said chamber,
   (l) means for removing the processed vegetation from said chamber and
   (m) means for removing the moisture laden air from the chamber.

2. A vegetation processing machine comprising:
   (a) enclosing means forming a processing chamber cylindrical in form, including
   (b) a substantially arcuate sieve,
   (c) a processing device within said chamber including
   (d) a shaft coaxial with said sieve, (e) a number of flexible chains longitudinally spaced and secured to said shaft,
(f) means for rotating said shaft and causing said chains to extend outwardly therefrom with portions thereof traveling in proximity to said sieve,
(g) a number of arms secured to the shaft and disposed between certain of said chains,
(h) means on said arms traveling in proximity to said sieves and adapted to progress the vegetation engaged thereby toward the path of movement of an adjoining chain,
(i) means for conducting air into said chamber to contact the vegetation therein and extract moisture therefrom,
(j) means for heating said air,
(k) means for feeding the vegetation into said chamber,
(l) means for removing the processed vegetation from said chamber and
(m) means for removing the moisture laden air from the chamber.

3. A vegetation processing machine comprising:
(a) enclosing means forming a processing chamber cylindrical in form, including
(b) a substantially arcuate sieve,
(c) a processing device within said chamber including
(d) a shaft coaxial with said sieve,
(e) a number of flexible flays longitudinally spaced and secured to said shaft,
(f) means for rotating said shaft and causing said flays to extend outwardly therefrom with portions thereof traveling in proximity to said sieve,
(g) a number of arms secured to the shaft and disposed between certain of said flays,
(h) blades on said arms traveling in proximity to said sieve and adapted to progress the vegetation engaged thereby toward the path of movement of an adjoining flay,
(i) means for conducting air into said chamber to contact the vegetation therein and extract moisture therefrom,
(j) means for heating said air,
(k) means for feeding the vegetation into said chamber,
(l) means for removing the processed vegetation from said chamber and
(m) means for removing the moisture laden air from the chamber.

4. A vegetation processing machine comprising:
(a) enclosing means forming a processing chamber cylindrical in form including
(b) a substantially arcuate sieve,
(c) a processing device within said chamber including
(d) a shaft coaxial with said sieve,
(e) a number of flexible flays longitudinally spaced and secured to said shaft,
(f) means for rotating said shaft and causing said flays to extend outwardly therefrom with portions thereof traveling in proximity to said sieve,
(g) a number of arms secured to the shaft and disposed between certain of said flays,
(h) means on said arms traveling in proximity to said sieve and adapted to progress the vegetation engaged thereby toward the path of movement of an adjoining flay,
(i) means for feeding the vegetation into said chamber,
(j) means for removing the processed vegetation from said chamber.

5. A vegetation processing machine comprising:
(a) enclosing means forming a processing chamber cylindrical in form including
(b) a substantially arcuate sieve,
(c) a processing device within said chamber including
(d) a shaft coaxial with said sieve,
(e) a number of flexible flays longitudinally spaced and secured to said shaft,
(f) means for rotating said shaft and causing said flays to extend outwardly therefrom with portions thereof traveling in proximity to said sieve,
(g) a number of arms secured to the shaft and disposed between certain of said flays,
(h) means on said arms traveling in proximity to said sieve and adapted to progress the vegetation engaged thereby toward the path of movement of an adjoining flay,
(i) means for conducting air into said chamber to contact the vegetation therein and extract moisture therefrom,
(j) means for heating said air
(k) means for causing movement of air through said sieve,
(l) means for feeding the vegetation into said chamber,
(m) means for removing the processed vegetation from said chamber and
(n) means for removing the moisture laden air from the chamber.

6. A vegetation processing machine comprising:
(a) enclosing means forming a processing chamber cylindrical in form including
(b) a substantially arcuate sieve,
(c) a processing device within said chamber including
(d) a shaft coaxial with said sieve,
(e) means carried by said shaft for flaying the vegetation within said cylinder,
(f) means for conducting air into said chamber to contact the vegetation therein and extract moisture therefrom,
(g) means forming a screenings chamber below said sieve for collecting the screenings passing through said sieve,
(h) conveying means within said screenings chamber extending along said rotor and discharging the screenings passing through the sieve from the screenings chamber,
(i) means for directing air into said screenings chamber and against said conveyor,
(j) means for feeding the vegetation into said chamber,
(k) means for removing the processed vegetation from said chamber and
(l) means for removing the moisture laden air from said chambers.

7. A vegetation processing machine comprising:
(a) enclosing means forming a processing chamber cylindrical in form including
(b) a substantially arcuate sieve,
(c) a processing device within said chamber including
(d) a shaft coaxial with said sieve,
(e) means carried by said shaft for flaying the vegetation within said cylinder,
(f) means forming a screenings chamber below said seive for collecting the screenings passing through said sieve, and
(g) conveying means within said screenings chamber extending along said rotor and discharging the screenings passing through the sieve from the screenings chamber,
(h) means forming a plenum chamber above said enclosing means,
(i) means for directing air under pressure into said plenum chamber,
(j) means forming passageways conducting air from said plenum chamber to said processing chamber,
(k) means forming passageways conducting air from said plenum chamber and to said screenings chamber,
(l) means for feeding the vegetation into said processing chamber, (m) means for removing the processed vegetation from said processing chamber and
(n) means for removing moisture laden air from said chambers.

8. A vegetation processing machine comprising:
(a) enclosing means forming a processing chamber cylindrical in form including
(b) a substantially arcuate sieve,
(c) a processing device within said chamber including
(d) a shaft,
(e) means carried by said shaft for flaying the vegetation within said cylinder,
(f) means forming a screenings chamber below said sieve for collecting the screenings passing through said sieve, and
(g) a conveyor having a screw flight situated in said screenings chamber below said sieve and extending along said processing device,
(h) means forming a plenum chamber above said enclosing means,
(i) means for directing air under pressure into said plenum chamber,
(j) means forming passageways conducting air from said plenum chamber to said processing chamber,
(k) a duct connected to said plenum chamber and extending along said screenings chamber,
(l) means forming passageways from said duct and to said screenings chamber and distributed along said screenings chamber,
(m) means for directing the air from said passageways and against said screw flight at various localities throughout the extent thereof,
(n) means for feeding the vegetation into one end of said chamber,
(o) means for removing the processed vegetation from said chamber.

9. A vegetation processing machine comprising:
(a) enclosing means forming a processing chamber substantially cylindrical in form including
(b) a substantially arcuate sieve,
(c) a processing device within said chamber including
(d) a shaft coaxial with said sieve,
(e) a number of flexible flays longitudinally spaced and secured to said shaft,
(f) means for rotating said shaft and causing said flays to extend outwardly therefrom with portions thereof traveling in proximity to said sieve,
(g) means forming another processing chamber including
(h) a concave having a substantially arcuate sieve,
(i) a rotary threshing device within said chamber cooperating with said concave,
(j) means for feeding vegetation to said last named processing chamber,
(k) means for feeding threshed vegetation from said last named processing chamber to said first named processing chamber,
(l) means cooperating with said last named rotor for chopping in pieces the vegetation entering said first named processing chamber,
(m) means for conducting air into said first named processing chamber,
(n) means for conducting air into said second named processing chamber,
(o) means for heating the air,
(p) means for removing the processed vegetation from the first named processing chamber and
(q) means for removing the moisture laden air from said second named processing chamber.

10. A vegetation processing machine comprising:
(a) enclosing means forming a processing chamber substantially cylindrical in form including
(b) a substantially arcuate sieve,
(c) a processing device within said chamber including
(d) a shaft coaxial with said sieve,
(e) a number of flexible flays longitudinally spaced and secured to said shaft,
(f) means for rotating said shaft and causing said flays to extend outwardly therefrom with portions thereof traveling in proximity to said sieve,
(g) means forming another processing chamber including
(h) a concave having a substantially arcuate sieve,
(i) a rotary threshing device within said chamber cooperating with said concave,
(j) the axis of said threshing device being at substantially right angles to a vertical plane containing the axis of said processing device,
(k) means for feeding vegetation to said threshing device in a direction transverse of its axis,
(l) means for feeding the discharge from said threshing device to said processing device at one end of said first processing chamber and in a longitudinal direction relative to the axis thereof,
(m) means for removing the processed vegetation from the other end of said first named processing chamber,
(n) means for conducting air into said first named processing chamber,
(o) means for conducting air into said second named processing chamber,
(p) means for heating the air, and
(q) means for removing the moisture laden air from said second named processing chamber.

11. A vegetation processing machine comprising:
(a) a housing,
(b) elongated enclosing means within said housing forming a processing chamber cylindrical in form and including
(c) a substantially arcuate sieve,
(d) a processing device within said chamber including,
(e) a shaft coaxial with said sieve,
(f) a number of flexible flays longitudinally spaced and secured to said shaft,
(g) means for rotating said shaft and causing said flays to extend outwardly therefrom with portions thereof traveling in proximity to said sieve,
(h) said enclosing means being spaced from said housing to form a plenum chamber above said enclosing means and to one side of said housing and a screenings chamber below said enclosure and other passageways on the other side,
(i) a blower for directing air under pressure to said plenum chamber,
(j) means forming passageways conducting air from said plenum chamber to said processing chamber,
(k) means for discharging the moisture laden air from said processing chamber,
(l) a conveyor in said screenings chamber for discharging the screenings from the machine,
(m) and means for discharging the processed vegetation from the machine.

12. A vegetation processing machine comprising:
(a) enclosing means forming a processing chamber substantially cylindrical in form including
(b) a substantially arcuate sieve,
(c) a processing device within said chamber including
(d) a shaft coaxial with said sieve,
(e) a number of flexible flays longitudinally spaced and secured to said shaft,
(f) means for rotating said shaft and causing said flays to extend outwardly therefrom with portions thereof traveling in proximity to said sieve,
(g) means forming another processing chamber including
(h) a concave having a substantially arcuate sieve,
(i) a rotary threshing device within said chamber cooperating with said concave,
(j) the axis of said threshing device being at substantially right angles to a vertical plane containing the axis of said processing device,
(k) means for feeding vegetation to said threshing device in a direction transverse of its axis,
(l) means for feeding the discharge from said threshing device to said processing device at one end of said first processing chamber and in a longitudinal direction relative to the axis thereof,
(m) means for removing the processed vegetation from the other end of said first named processing chamber,
(n) means for conducting air into said first named processing chamber,
(o) means for conducting air into said second named processing chamber,
(p) a conveyor extending beneath said concave and removing the screenings passing through both concaves from the machine,
(q) means for removing the moisture laden air from said second named processing chamber.

13. A vegetation processing machine comprising:
(a) enclosing means forming a processing chamber substantially cylindrical in form and including
(b) a substantially arcuate sieve,
(c) a processing device within said chamber,
(d) a housing for said enclosing means comprising an upper section and a lower section,
(e) said lower section comprising side walls spaced outwardly from said enclosing means and connected thereto, and a V-shaped bottom connected to said side walls and forming a screenings chamber below said enclosure,
(f) said upper section comprising a top, sides extending outwardly of the side walls of said lower section, and bottom members extending between the lower ends of said sides and side walls,
(g) end plates closing the ends of said lower section and ends closing the ends of said upper section,
(h) said upper section at the localities of said bottom members being formed on one side with a plenum chamber and on the other side with a trunk passageway communicating with the processing chamber,
(i) said plenum chamber being in communication with said trunk passageway,
(j) a blower for directing air under pressure to said plenum chamber,
(k) means for discharging the moisture laden air from said processing chamber,
(l) a conveyor in said screenings chamber for discharging the screenings from the machine,
(m) and means for discharging the processed vegetation from the machine.

14. A vegetation processing machine comprising:
(a) a housing,
(b) elongated enclosing means within said housing forming a processing chamber cylindrical in form and including
(c) a substantially arcuate sieve,
(d) means for introducing the vegetation to be processed into said processing chamber at one end thereof,
(e) means for discharging the processed material from said processing chamber at the other end thereof,
(f) means for delivering air under pressure to said processing chamber,
(g) means forming an outlet from the processing chamber at the first named end thereof, and
(h) means for blowing air in a direction opposite to the direction of travel of air through said outlet to remove solid matter floating in the air to be discharged.

15. A vegetation processing machine comprising:
(a) a housing,
(b) elongated enclosing means within said housing forming a processing chamber cylindrical in form and including
(c) a substantially arcuate sieve,
(d) means for introducing the vegetation to be processed into said processing chamber at one end thereof,
(e) means for discharging the processed material from said processing chamber at the other end thereof,
(f) means for delivering air under pressure to said processing chamber at various pre-selected localities throughout the extent thereof.

16. A vegetation processing machine comprising:
(a) a housing,
(b) elongated enclosing means within said housing forming a processing chamber cylindrical in form and including
(c) a substantially arcuate sieve,
(d) said enclosing means further including an arcuate top,
(e) the top of said enclosing means being spaced from said housing to form a plenum chamber therebetween,
(f) means for directing air under pressure to said plenum chamber,
(g) said arcuate top having a number of inlet openings in the same extending along said top and adapted to communicate with said processing chamber and said plenum chamber,
(h) closures for said openings adapted to be selectively operated to open or close the said openings and to direct the air into said processing chamber at the desired localities,
(i) means forming a discharge outlet for the moisture laden air,
(j) means for feeding vegetation to be processed into said processing chamber and
(k) means for removing the processed vegetation therefrom.

17. A vegetation processing machine comprising:
(a) enclosing means forming a processing chamber substantially cylindrical in form including
(b) sieves disposed along the length thereof,
(c) means for feeding vegetation to be processed into said chamber at one end thereof,
(d) means for discharging the processed material from the other end thereof,
(e) means for directing heated air into said chamber,
(f) means for discharging the screenings from the sieve nearest the discharge end of the enclosure out of the machine,
(g) means for discharging the screenings from the other sieves separately out of the machine and
(h) means for discharging the moisture laden air from the machine.

References Cited by the Examiner
UNITED STATES PATENTS
2,543,571  2/1951  Ferrari _____ 146—76

DONALD R. SCHRAN, *Primary Examiner.*

WILLIAM W. DYER, JR., G. A. DOST, *Examiners.*